United States Patent [19]
Feldmesser

[11] 3,914,697

[45] Oct. 21, 1975

[54] PFN REGULATOR

[75] Inventor: Howard S. Feldmesser, Columbia, Md.

[73] Assignee: Westinghouse Electric Corporation, Pittsburgh, Pa.

[22] Filed: Nov. 15, 1975

[21] Appl. No.: 524,293

Related U.S. Application Data

[63] Continuation of Ser. No. 176,190, Aug. 30, 1971, abandoned.

[52] U.S. Cl. .................... 328/67; 307/264; 307/297

[51] Int. Cl.[2] ........................ H03K 1/14; H03K 1/02

[58] Field of Search ............................... H03K/3/86; 328/65–67; 307/297, 264, 268

[56] References Cited

UNITED STATES PATENTS

| | | | |
|---|---|---|---|
| 2,470,895 | 5/1949 | Marlowe et al. | 328/226 X |
| 3,124,754 | 3/1964 | Scoles | 328/67 X |
| 3,139,585 | 6/1964 | Ross et al. | 328/67 X |
| 3,363,184 | 1/1968 | Smith | 328/67 X |

*Primary Examiner*—John Zazworsky
*Attorney, Agent, or Firm*—D. Schron

[57] ABSTRACT

A pulse forming network (PFN) is charged to an initial voltage level above a desired operating level. The PFN is then slowly discharged by a controlled discharge path, exponentially down to a final desired operating level, at which main discharge into a load occurs.

4 Claims, 4 Drawing Figures

PFN REGULATOR

CROSS REFERENCE TO RELATED APPLICATION

This is a continuation of application Ser. No. 176,190, filed Aug. 30, 1971, and now abandoned.

This application is related in subject matter to application Ser. No. 175,896 entitled IMPROVED PFN VOLTAGE REGULATOR, filed Aug. 30, 1971, now U.S. Pat. No. 3,781,690 and assigned to the same assignee as the present invention.

BACKGROUND OF THE INVENTION

1. Field of the Invention:

Pulse forming network voltage control circuitry.

2. Description of the Prior Art:

A typical PFN consists of a series of inductors having capacitors interposed in parallel therebetween and operates by storing up energy supplied to it over a relatively long period of time and then discharging the stored energy in a short period of time as a pulse.

Such networks find particular utility in radar systems, laser systems and other systems which require repetitive pulses. Ideally after each discharge, the PFN should charge up to the same voltage each time so that the output pulses will all be of the same voltage. However, due to variations in the power supply, stray capacitance, and/or inductive coupling from other circuits, there is pulse to pulse variation in the repetitive operation of the PFN. In order to reduce the pulse to pulse voltage variation on the PFN, a regulator is generally used. One form of regulator which has been proposed utilizes zener diodes in shunt configuration with the PFN. The breakdown voltage of these diodes, however, drift with temperature and their use precludes fine adjustment. Another proposal utilizes an auxiliary discharge circuit such as described in U.S. Pat. No. 3,124,754. In that arrangement, a PFN is initially charged to a value greater than the value of the pulse finally required. A sawtooth voltage is compared with the PFN voltage and at a predetermined difference a pulse is produced to a thyratron switch tube to place a resistor in shunt circuit configuration across the PFN whereby the PFN is discharged toward ground potential at a substantially linear rate until the main discharge. Such circuit decreases the pulse to pulse voltage variation, however, the uncontrolled discharge at a fixed rate still results in objectionable and unacceptable variations.

SUMMARY OF THE INVENTION

A PFN is provided with charging current and is operable to provide a main discharge output pulse in repetitive cycles.

The PFN is charged to an initial voltage level subject to deviation from cycle to cycle. Means are provided for regulating the voltage of the PFN down, in a controlled manner, to a desired operating voltage level after which main discharge into a system load is initiated.

DESCRIPTION OF THE PREFERRED EMBODIMENT

Figure 1:
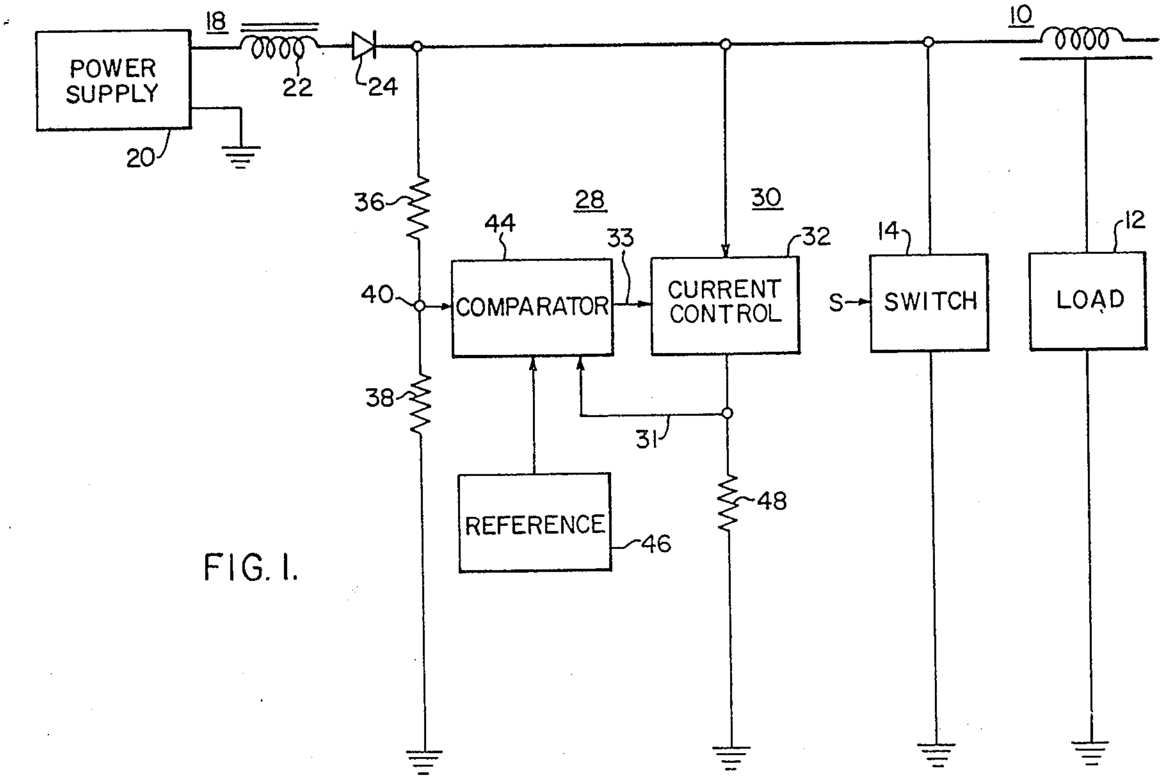
FIG. 1 illustrates an embodiment of the present invention.

In FIG. 1, there is illustrated a PFN 10 operable to discharge stored energy through a system load circuit 12 when switch 14 is activated by a system signal S.

Charging current is supplied to the PFN 10 by a charging circuit 18 including a power supply 20, a charging choke 22 and a diode 24. A resonant charging arrangement is formed by the choke 22 and the capacitance of the PFN 10 to charge the PFN to a voltage somewhat less than twice the power supply voltage. Due to power supply variations as well as other factors, the PFN will not necessarily get charged up to the same voltage after each main discharge.

In order to insure that all the pulses provided by the PFN 10 do not vary in voltage by more than acceptable limits, there is provided the regulation circuit 28, which during each cycle allows overcharge of the PFN and then regulates the voltage down to a final desired voltage level and which regulation may vary, dependent upon the difference in the actual PFN voltage of the final desired voltage level.

The regulation circuit 28 includes a discharge path 30 having a current control means 32 operable to control the value of current in the path 30 in response to a control signal provided thereto on line 33.

Generation of the control signal to accomplish the operation set forth is dependent upon a comparison of the actual PFN voltage with a desired voltage level. Accordingly, an indication of the actual PFN voltage is obtained by, for example, a voltage divider network including resistors having a predetermined ratio so that the voltage at point 40 is lower than, but indicative of, the PFN voltage.

A comparator means 44 is provided for comparing the voltage at point 40 with a reference voltage provided by reference means 46.

To better maintain regulator stability, resistor 48 is placed in the controlled discharge path 30 to provide a feedback signal on line 31 to the comparator means 44.

As will be described this circuitry will allow an overcharge of the PFN to an initial voltage level and will thereafter provide for a discharge to a desired operating voltage level in a controlled manner, which may vary from cycle to cycle.

Figure 2:
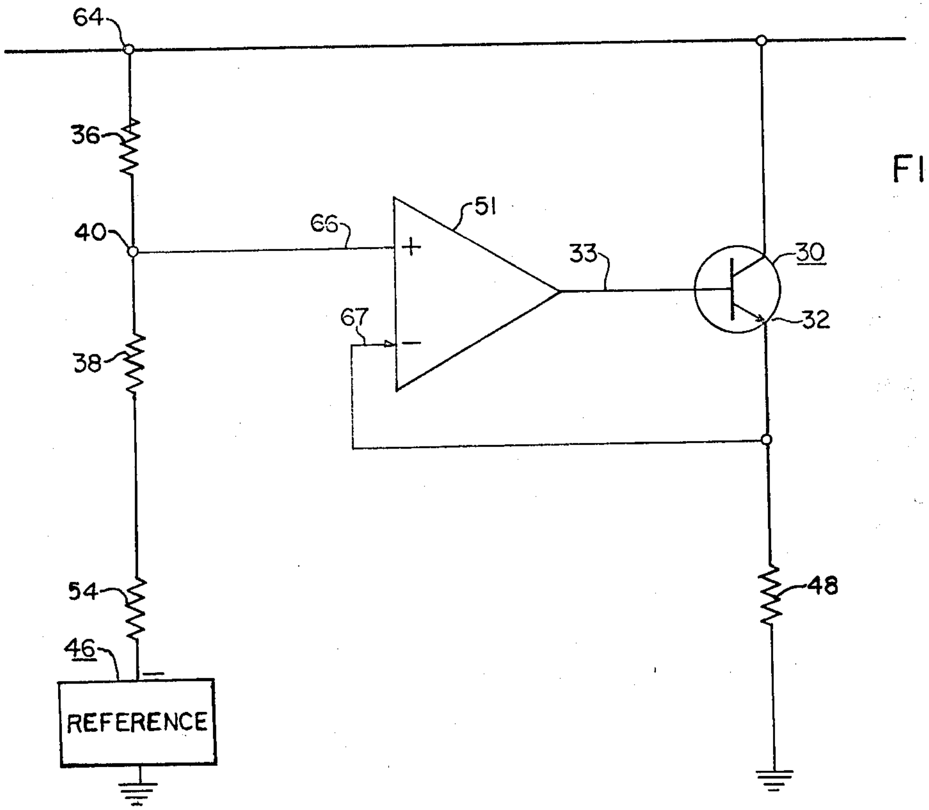
FIG. 2 illustrates a portion of FIG. 1 in somewhat more detail.

In FIG. 2, the principle of operation of the voltage divider network and reference means is similar to that in FIG. 1, however, they are illustrated in an alternative arrangement. Instead of the lower end of voltage divider resistor 38 being connected to ground as in FIG. 1, it is connected to the reference means 46 having a negative reference supply and a resistor 54.

The current control means 32 may take various forms and is illustrated as a transistor having one electrode connected to the PFN, another electrode connected to a reference potential, such as ground, by way of resistor 48, and a third connected to receive the output signal from differential amplifier 51.

Figure 3:
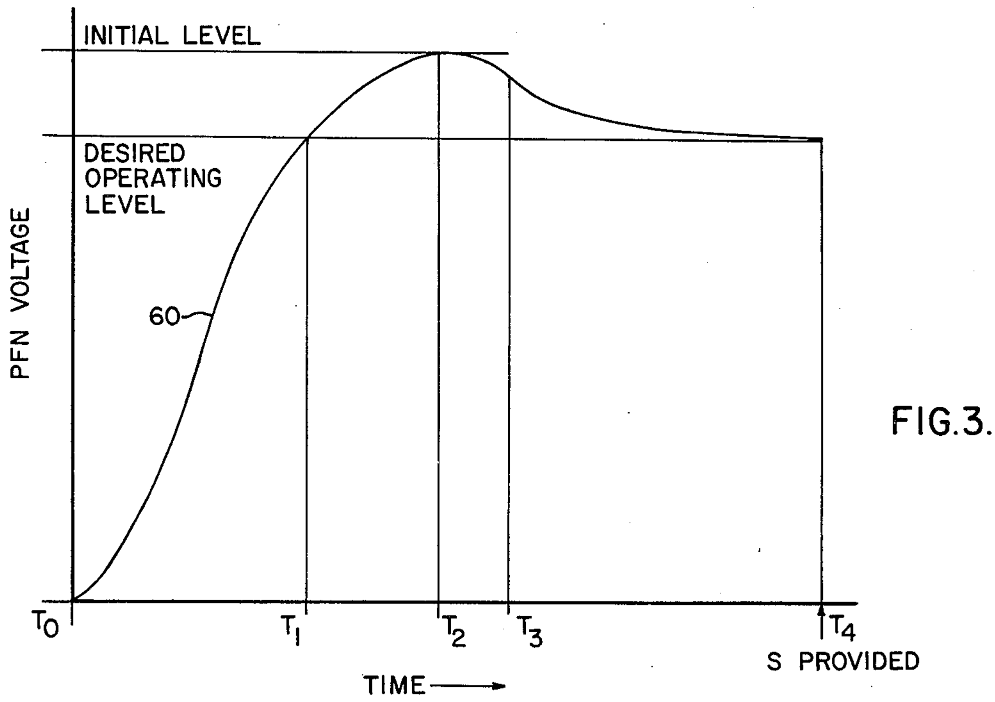
FIG. 3 is a curve of PFN voltage illustrating the operation of the present invention.

Operation of the circuitry will be explained with additional reference to FIG. 3, illustrating the PFN voltage as a function of time.

Initially, a desired operating level is chosen. That is, the voltage of the PFN output pulse is determined by system requirements. Component values are chosen so that the PFN will charge to an initial level higher than the final desired level. For example, the initial level may be a few percent higher than the final. The over voltage may vary, however, due to power supply variations, etc. The discharge path 30 is controlled to regulate the voltage down to the final desired level determined by the value of the voltage reference 46.

The control of the transistor 32 is accomplished with the provision of differential amplifier means 51 which receives an error signal at point 40 as one input and a negative feedback signal from resistor 48 as the other input.

At time $T_0$ in FIG. 3, the resonant charging arrangement begins charging of the PFN to an initial voltage level which is reached at time $T_2$. Prior to that time, the curve 60 crosses the desired operating voltage level. Due to the negative reference, the voltage at point 40 is initially negative with respect to the voltage at point 64, the PFN voltage. The input to the positive input 66 of the differential amplifier is therefore negative and no output signal is provided to initiate conduction of transistor 32. Just past the operating level at time $T_1$, the voltage at point 64, the PFN voltage, is such as to make point 40 very slightly positive so that differential amplifier 51 provides an output signal to start conduction of transistor 32, and some charging current goes through path 30. The current through resistor 48 causes a voltage drop thereacross and a feedback signal is provided to the negative input 67 of the differential amplifier. By this negative feedback arrangement, the voltage across resistor 48 is approximately equal to the voltage at point 40, and the current in transistor 32 is directly proportional to the difference between the actual and the desired PFN voltage level.

At time $T_2$, the current from the charging system is substantially equal to the current through the shunt regulator, transistor 32, and the PFN is charged to its peak level. Current continues through the transistor 32 but as the charging circuit current decreases, some current is drawn from the PFN, reducing its voltage as seen by curve 60 from $T_2$ to $T_3$. At $T_3$ when no more charging current is available, the transistor draws all its current from the PFN in accordance with how far the voltage on the PFN is away from the desired operating level. Ideally, the discharge follows an exponential decay with a time constant $\tau$ determined by the capacitance of the PFN and the apparent resistance of the regulation circuit. This apparent resistance is equal to the value of resistor 36 multiplied by the value of resistor 48 and divided by the value of resistor 38.

As the exponential decay approaches the desired operating level, the voltage of the PFN also exponentially approaches this level to where the error signal at point 40 would again be zero and at time $T_4$ the PFN is discharged through the load by application of signal S to switch 14 (see FIG. 1).

The curve of FIG. 3 is not necessarily to scale and is somewhat idealized to serve to explain the operation of the circuitry. The actual shape may deviate to some extent depending on the various ways of implementing the circuitry and dependent upon component characteristics and values.

Figure 4:
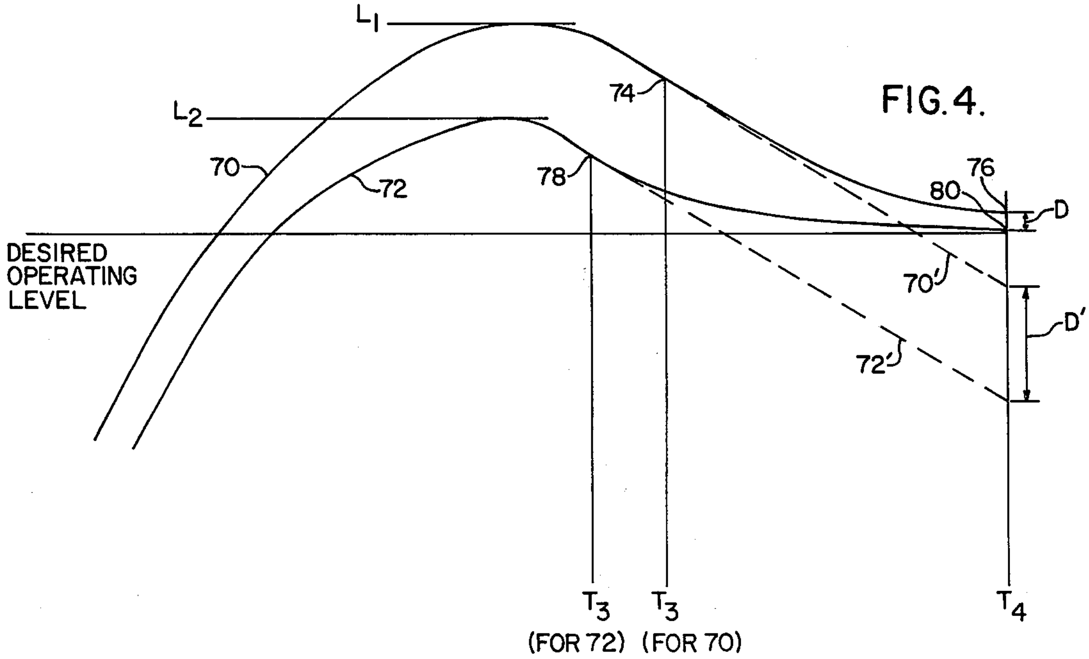
FIG. 4 is an enlargement of a portion of the type of curve illustrated in FIG. 3 for two different charging cycles.

FIG. 4 serves to illustrate one benefit derived with the present invention. Curve 70 represents a portion of the PFN voltage curve for one pulse and curve 72 represents the same portion for a subsequent pulse. The curves are not coincident due to the initial charging to different levels $L_1$ and $L_2$ respectively. If past the respective initial levels $L_1$ and $L_2$, the curves were continued as illustrated by the dotted portions 70' and 72', as in the prior art, to a firing time $T_4$ there would exist a voltage difference D' which would be objectionable for many systems. However, in accordance with the present invention, the curves are regulated down to the desired operating level and the decay, if exponential, will bring the PFN voltage 63.2 percent closer to the desired voltage in one time constant. In other words, the value of curve 70 at point 74 will reduce according to an exponential decay and will bring the PFN voltage 63.2 percent closer to the desired voltage, in one time constant. If the time distance between $T_3$ and $T_4$ is several time constants, the distance from the desired PFN voltage will decrease by 63.2 percent after each time constant until a final value at point 76 is reached at $T_4$.

Similarly, the decay curve 72 will reduce the value of point 78 to a new value at point 80, at which time firing occurs. As firing time $T_4$ is approached, the voltage difference between curves 70 and 72 reduces exponentially and the difference D at $T_4$ is substantially reduced and within acceptable limits.

Although the pulse forming network has been indicated as including a plurality of inductors and capacitors, it is to be understood that the term "pulse forming network" is equally applicable to any network, such as one or more capacitors, which is charged and discharged repetitively to provide pulses.

What is claimed is:

1. Pulse forming network regulation circuitry comprising:

A. a pulse forming network operable to store energy and provide said energy as a discharge pulse to a load circuit upon application of a firing signal at a time of firing;

B. means for charging said pulse forming network to an initial voltage level subject to deviation from one pulse time to another;

C. a D.C. reference potential;

D. means for generating an error signal indicative of the difference between said reference potential and PFN voltage; and E. means responsive to said error signal for regulating the voltage of said pulse forming network down to a desired operating voltage level and maintaining the pulse forming network voltage substantially at said desired operating voltage level regardless of said time of firing.

2. Pulse forming network regulation circuitry comprising:

A. a pulse forming network operable to store energy and provide said energy as a discharge pulse to a load circuit upon application of a firing signal at a time of firing;

B. means for charging said pulse forming network to an initial voltage level subject to deviation from one pulse time to another;

C. a discharge path including current control means operatively connected to said pulse forming network;

D. means for obtaining an indication of pulse forming network voltage;

E. means for providing a D.C. reference potential indicative of a desired operating voltage level to which said pulse forming network voltage is to be regulated;

F. means for comparing said D.C. reference potential and said indication of pulse forming network voltage for providing an error signal;

G. said error signal being connected to control said current control means to reduce the current therethrough to maintain said pulse forming network voltage substantially at said desired operating level regardless of said time of firing.

3. Apparatus according to claim 2 wherein;

A. said current control means includes a three electrode device, a first electrode being connected to said pulse forming network, an electrode being connected to a reference potential and a third electrode constituting an input; and which includes B. amplifier means having an input for receiving said error signal and an output connected to said third electrode.

4. Apparatus according to claim 3, wherein:

A. said amplifier means is a differential amplifier having first and second inputs;

B. said error signal being connected to said first input; and additionally including, C. means for providing a feedback signal indicative of the current through said current control means; and D. said feedback signal being connected to said second input.

* * * * *